US006516679B2

(12) United States Patent
Yates et al.

(10) Patent No.: US 6,516,679 B2
(45) Date of Patent: Feb. 11, 2003

(54) ECCENTRIC ASSEMBLY WITH ECCENTRIC WEIGHTS THAT HAVE A SPEED DEPENDENT PHASED RELATIONSHIP

(75) Inventors: Steve K. Yates, Scotland, PA (US); Vern E. Martin, Shippensburg, PA (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/771,824

(22) Filed: Jan. 29, 2001

(65) Prior Publication Data

US 2002/0100339 A1 Aug. 1, 2002

(51) Int. Cl.[7] .......................... F16H 33/00; B06B 1/16; E01C 19/38

(52) U.S. Cl. ................................ 74/87; 74/61; 404/117

(58) Field of Search ....................... 74/87, 61; 404/117; 198/770

(56) References Cited

U.S. PATENT DOCUMENTS 2,481,174 A 9/1949 Strawn
2,930,244 A * 3/1960 Hutchinson et al. ........... 74/87
2,989,869 A 6/1961 Hanggi
3,822,604 A 7/1974 Grimmer
3,896,677 A 7/1975 Larson
3,919,575 A 11/1975 Weber et al.
4,033,193 A 7/1977 Brander
4,341,126 A 7/1982 Thomas
4,342,523 A 8/1982 Salani
4,367,054 A 1/1983 Salani et al.
4,481,835 A * 11/1984 Storm ........................... 74/87
4,550,622 A 11/1985 La Bonte et al.
4,561,319 A * 12/1985 Lilja ............................ 74/87
4,830,534 A 5/1989 Schmelzer et al.

FOREIGN PATENT DOCUMENTS

DE 32 02 532 * 8/1983
FR 531184 11/1957

* cited by examiner

*Primary Examiner*—William C Joyce
(74) *Attorney, Agent, or Firm*—Michael Best & Friedrich LLP

(57) ABSTRACT

The eccentric assembly includes a shaft, first and second eccentric weights, and a member. The first and second eccentric weights are rotatably coupled to the shaft such that they generate vibrations which are transferred to the drum assembly of the vibration compacting machine when the shaft is rotated by a motor. The eccentric weights are also coupled to the shaft by the member which moves the eccentric weights between a first position where the eccentric weights are in phase and a second position where the eccentric weights are out-of-phase. When the eccentric weights are in phase the eccentric assembly generates a maximum moment of eccentricity about the shaft. As the rotational speed of the shaft increases to generate higher frequency vibrations, the eccentric weights move more out of phase reducing the moment of eccentricity generated by the rotating shaft.

22 Claims, 4 Drawing Sheets

ECCENTRIC ASSEMBLY WITH ECCENTRIC WEIGHTS THAT HAVE A SPEED DEPENDENT PHASED RELATIONSHIP

FIELD OF THE INVENTION

This invention relates to vibration compacting machines, and more particularly to an eccentric assembly for a vibration compacting machine.

BACKGROUND OF THE INVENTION

Vibration compacting machines are used in leveling paved or unpaved ground surfaces. A typical vibration compacting machine includes one or two vibrating drum(s) that transfer vibrations to the ground. The eccentric assembly commonly includes one or more eccentric weights that are adjustable between a plurality of discrete radial positions relative to the shaft in order to vary the amplitude of the vibrations that are generated by rotating the eccentric weight(s) about the shaft.

One type of adjustable eccentric assembly operates by varying the rotational speed of the shaft. The eccentric assembly includes one or more eccentric weights that are biased toward the shaft. During operation of the eccentric assembly the shaft rotates, and as the rotational speed of the shaft increases, a centrifugal force overcomes the biasing force and causes the eccentric weight(s) to move away from the shaft. The vibration amplitude increases as the eccentric weights move away from the shaft.

Another type of device that is operable between a first mode having a high amplitude vibration and a second mode having a low amplitude vibration includes a plurality of eccentric weights that are fixed to the shaft and a corresponding number of counterweights that are coupled to the opposite side of the shaft relative to the eccentric weight. The counterweights are moveable between a retracted position and a projected position relative to the longitudinal axis of the shaft. When the counterweights are in the retracted position their effect on the eccentric weights is minimized resulting in maximum vibration amplitude being generated by the eccentric weights. The counterweights are normally biased toward the retracted position, however as the shaft rotates the biasing force is overcome and the counterweights are moved to the projected position where the counterweights are further away from the shaft. As the counterweights move further from the shaft, the counterweights reduce the effect of the eccentric weights resulting in a lower vibration amplitude.

The above-described eccentric assemblies are generally effective for creating vibration within vibration compacting machines. Therefore, any improvement to such eccentric assemblies would be desirable.

SUMMARY OF THE INVENTION

The present invention is directed to an eccentric assembly for a vibration compacting machine. The eccentric assembly of the present invention is rotated by a motor in order to generate vibrations that are transferred to the ground via a drum. The eccentric assembly rotates at high speeds in order to generate high frequency vibrations, and is configured to reduce the vibration amplitudes at such high frequencies. Reducing the amplitude of the vibrations at high vibration frequencies minimizes wear to each of the load bearing components in the vibration compacting machine resulting in an extended service life for the vibration compacting machine. The eccentric assembly of the present invention is also easily assembled, inexpensively manufactured, and readily adapted to be used in existing vibration compacting machines.

The eccentric assembly includes a shaft, first and second eccentric weights, and a member. The first and second eccentric weights are rotatably coupled to the shaft such that they generate vibrations which are transferred to the ground via the drum when the shaft is rotated by a motor. The eccentric weights are also coupled to the shaft by the member which moves the eccentric weights between a first position where the eccentric weights are in phase and a second position where the eccentric weights are out-of-phase. When the eccentric weights are in phase the eccentric assembly generates a maximum moment of eccentricity about the shaft. As the rotational speed of the shaft increases to higher frequency vibrations, the eccentric weights move out of phase reducing the moment of eccentricity. Reducing the moment of eccentricity at higher rotational speeds results in lower vibration amplitudes for the higher frequency vibrations.

The member is preferably biased toward the first or phased position by a spring. When the shaft is rotated at high enough speeds, a centrifugal force is generated on the member which overcomes the biasing force generated by the spring such that the member moves toward the second or out-of-phase position thereby lowering the moment of eccentricity.

Other features and advantages of the invention will become apparent to those skilled in the art upon review of the following detailed description, claims, and drawings.

Figure 1:
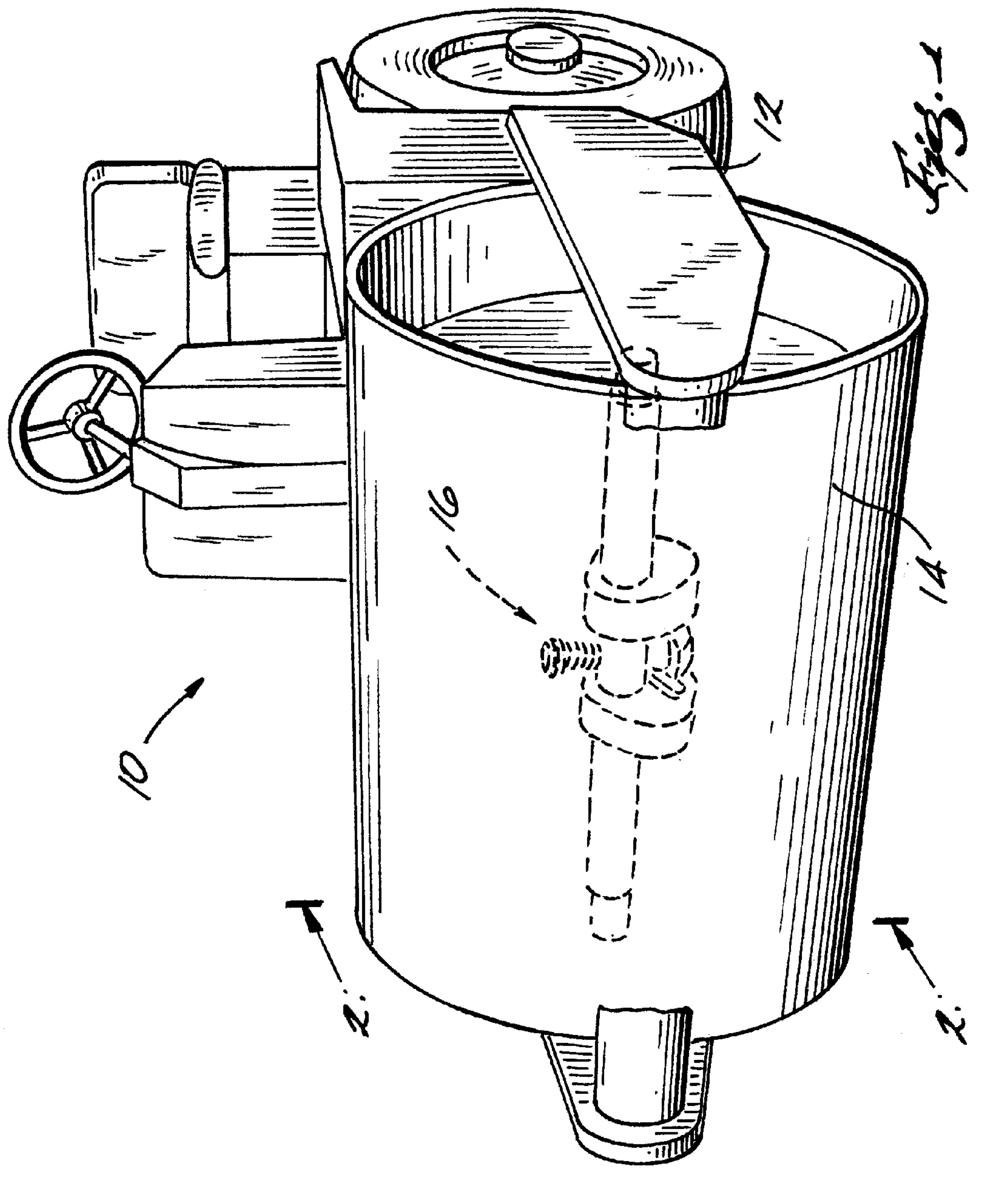
FIG. 1 is a perspective view of a vibration compacting machine that includes an eccentric assembly of the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a vibration compacting machine 10 according to the present invention. The vibration compacting machine 10 is used in leveling paved or unpaved ground surfaces. The vibration compacting machine 10 includes a frame 12, a drum assembly 14, and an eccentric assembly 16. The drum assembly 14 is mounted to the frame 12 for rotation about a longitudinal axis 13.

Figure 2:
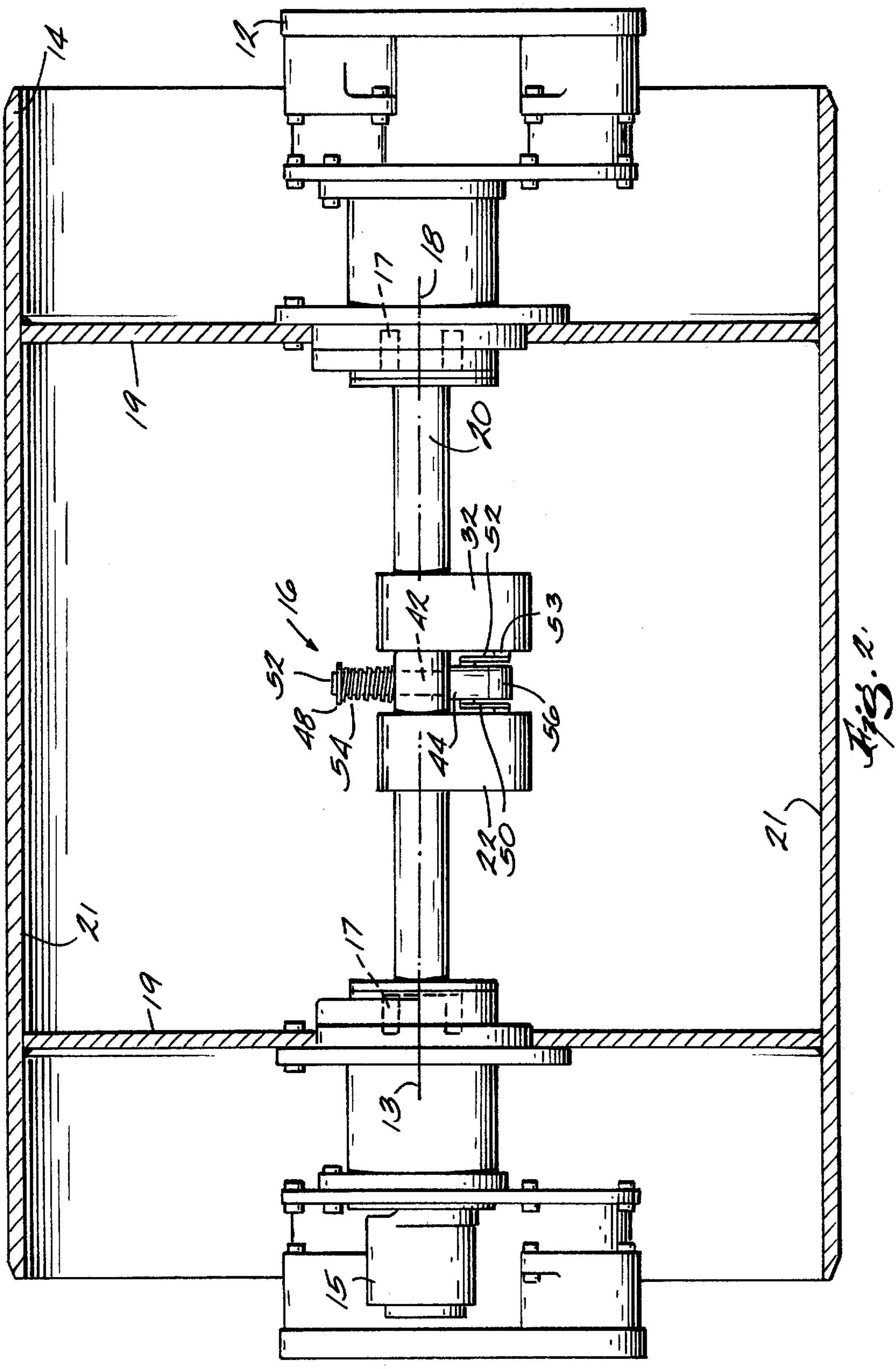
FIG. 2 is a section view of a drum assembly of the vibration compacting machine illustrated in FIG. 1 taken along line 2—2.

Referring now also to FIG. 2, the eccentric assembly 16 is rotatably mounted within the drum assembly 14, which is rotatably mounted to the frame 12. A motor 15 rotates the eccentric assembly 16 about an axis of rotation 18 that is substantially aligned with the longitudinal axis 13 of the drum assembly 14.

The eccentric assembly 16 includes an unbalanced mass such that rotating the eccentric assembly 16 generates vibrations that are transferred to the drum assembly 14.

The eccentric assembly 16 includes a shaft 20 that is mounted at each end to bearings 17 (shown only in FIG. 2). The bearings 17 are secured to parallel supports 19 that extend across the inner diameter of the drum assembly 14. The supports 19 are welded to a drum 21 of the drum assembly 14 and are generally perpendicular to the longitudinal axis 13 of the drum assembly 14. During operation, the motor 15 rotates the shaft 20 about the axis of rotation 18 such that the eccentric assembly 16 generates vibrations.

Figure 5:
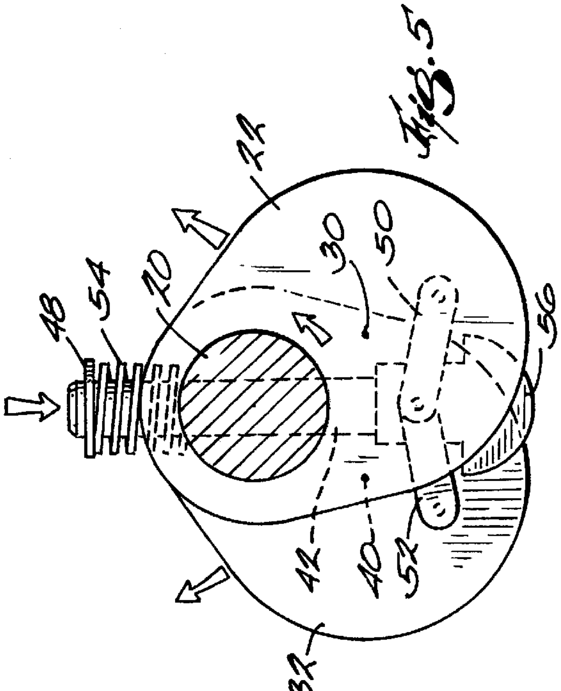
FIG. 5 is a section view similar to FIG. 4, illustrating the eccentric assembly in a dynamic high frequency condition with the eccentric weights out-of-phase.
Figure 3:
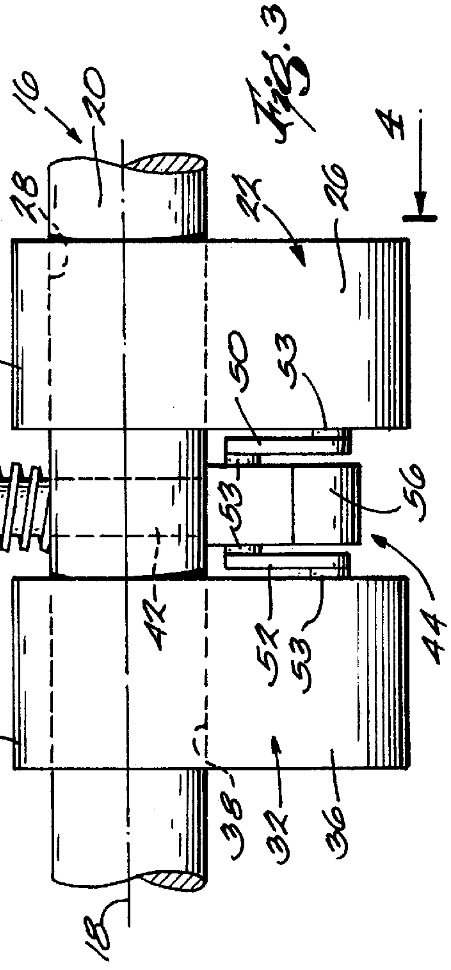
FIG. 3 is an enlarged partial front view of the eccentric assembly used in the drum assembly illustrated in FIG. 2.
Figure 4:
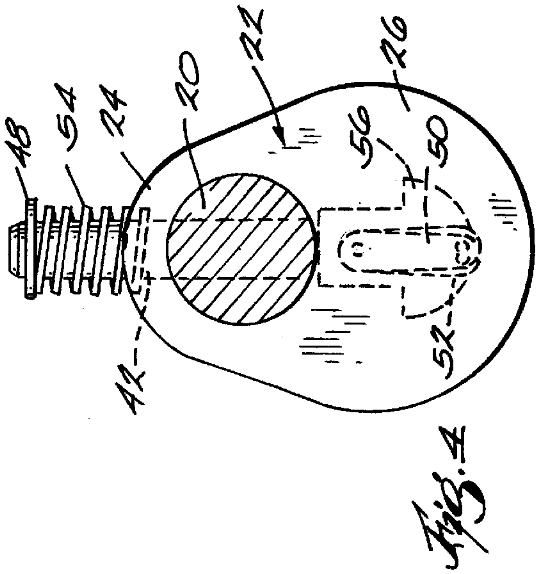
FIG. 4 is a section view taken along line 4—4 in FIG. 3, illustrating the eccentric assembly in a static condition with eccentric weights of the eccentric assembly in phase.

Referring now also to FIGS. 3–5, the eccentric assembly 16 in one embodiment of the invention includes a first eccentric weight 22 that is rotatably mounted to the shaft 20. The first eccentric weight 22 is preferably wedge-shaped and includes a narrow portion 24 and a wide portion 26. The narrow portion 24 includes a hole 28 through which the shaft 20 extends. The first eccentric weight 22 has a center of gravity 30 that is located a distance away from the axis of rotation 18 such that the eccentric assembly 16 has a moment of eccentricity about the shaft 20.

The eccentric assembly 16 further includes a second eccentric weight 32 that is rotatably mounted to the shaft 20. The second eccentric weight 32 is preferably similar in shape to the first eccentric weight 22 (i.e., wedge-shaped) and includes a narrow portion 34 and a wide portion 36. The shaft extends through a hole 38 in the narrow portion 34. The second eccentric weight 32 has a center of gravity 40 that is located a distance away from the axis of rotation 18 such that the second eccentric weight 32 adds to the moment of eccentricity about the shaft 20 generated by the first eccentric weight 22 because the second eccentric weight 32 is initially in phase with the first eccentric weight 22 (FIG. 4).

The eccentric assembly 16 also includes a member 42 that is slidably connected to the shaft 20 at a position between the first eccentric weight 22 and the second eccentric weight 32. The member 42 is preferably a cylindrically-shaped rod that extends through the shaft 20 in a direction perpendicular to the axis of rotation 18. The member 42 includes a first end 44 and a second end 46. The first end 44 is coupled to the first eccentric weight 22 and the second eccentric weight 32 while the second end 46 includes a spring retainer 48

The member 42 is moveable in a radial direction between a first position and a second position. When the member is in the first position (FIG. 4) the first and second eccentric weights 22, 32 are in phase with each other and when the member is in the second position (FIG. 5) the first and second eccentric weights 22, 32 are out of phase.

The words "in phase" are used throughout the specification to designate that the first eccentric weight 22 and the second eccentric weight 32 are located at the same angular position with respect to the shaft 20. As an example, if the eccentric weights 22, 32 were both located in the 6 o'clock position, there would be 0 degrees between them and they would be said to be in phase. The phrase "out of phase" is similarly used to designate that the first and second eccentric weights 22, 32 are located at different angular positions in relation to the shaft 20. If the first eccentric weight 22 is located at the 6 o'clock position and the second eccentric weight 32 is located at the 9 o'clock position, there would be an angle between them (i.e., 90 degrees) and the eccentric weights 22, 32 would be out of phase.

When the eccentric weights 22, 32 are in phase, the eccentric assembly 16 has a maximum moment of eccentricity about the shaft 20. As the eccentric weights 22, 32 move out of phase, the moment of eccentricity about the shaft 20 decreases. The eccentric assembly 16 would have a minimum moment of eccentricity when the first and second eccentric weights 22, 32 are spaced 180 degrees apart because the moment of eccentricity of the first eccentric weight 22 would cancel out the moment of eccentricity of the second eccentric weight 32.

The first end 44 of the member 42 is connected to the wide portion 26 of the first eccentric weight 22 by a first linkage 50 and is connected to the wide portion 36 of the second eccentric weight 32 by a second linkage 52. The linkages 50, 52 preferably include shoulder bolts 53 that permit rotation of the linkages 50, 52 about the shoulder bolts 53. When the member 42 is in the first position, the linkages 50, 52 maintain the first and second eccentric weights 22, 32 in phase and as the member 42 moves toward the second position, the linkages 50, 52 move the first and second eccentric weights 22, 32 out of phase.

As shown most clearly in FIG. 4, the linkages 50, 52 are almost parallel to each other and to the member 42. One end of the first and second linkages 50, 52 is connected to the first end 44 of the member 42 and the opposing end of the first and second linkages 50, 52 is connected to one of the respective eccentric weights 22, 32.

Referring to FIG. 5, as the first end 44 of the member 42 moves away from the shaft 20 from the first position toward the second position, the opposing ends of the first and second linkages 50, 52 separate from each other causing the first and second counterweights 22, 32 to move out of phase.

The eccentric assembly 16 further includes a spring 54 located on the second end 46 of the member 42. The spring 54 is positioned between the spring retainer 48 and the shaft 20. The spring 54 is preferably a coil spring that biases the member 42 towards the first position.

As shown most clearly in FIGS. 3–5, a third eccentric weight 56 is connected to the first end 44 of the member 42. The third eccentric weight 56 is configured so that it does not interfere with the linkages 50, 52. Rotating the shaft 20 generates a centrifugal force that acts on the third eccentric weight 56. As the rotational speed of the shaft 20 increases, the centrifugal force on the third eccentric weight increases until the centrifugal forces overcome the biasing force of the spring 54 and moves the member 42 from the first position toward the second position.

During operation of the eccentric assembly 16, the shaft 20 begins at rest such that the member 42 is in the first position and the first and second eccentric weights 22, 32 are in phase. The biasing force of the spring 54 maintains the third eccentric weight 56 as close to the shaft as the physical configuration of the various components permits. As stated previously, when the first and second eccentric weights 22, 32 are in phase the eccentric assembly 16 has a maximum moment of eccentricity. The motor 15 begins rotating the shaft 20 in order to begin transferring vibrations to the vibration compacting machine 10. The eccentric assembly 16 rotates in either direction, however it is a performance advantage to rotate the shaft 20 in the same direction as the drum assembly 14.

Once the shaft begins rotating, the centrifugal force created by the rotation urges the third eccentric weight 56 to move away from the axis of rotation 18 of the shaft 20. When the shaft 20 rotates at a high enough speed, the centrifugal force acting on the third eccentric weight 56 overcomes the biasing force provided by the spring 54 such that the third eccentric weight 56 further compresses the spring 54 and slides the member 42 away from the first position. As the member 42 moves from the first position, the first end 44 of the member 42 moves the linkages 50, 52 such that the first linkage 50 moves the first eccentric weight 22 in one direction about the shaft and the second linkage 52 moves the second eccentric weight 32 in an opposite direction about the shaft. The moment of eccentricity of the eccentric assembly 16 decreases from the maximum because the first and second eccentric weights 50, 52 move out of phase with each other thereby offsetting the effect each eccentric weight 22, 32 has on the moment of eccentricity.

It should be noted that because the third eccentric weight 56 is moving radially away from the axis of rotation 18, the third eccentric weight 56 actually increases the moment of eccentricity. However, this increase is negligible when compared to the substantial decrease in the eccentric assembly's moment of eccentricity caused by moving the first and second eccentric weights 22, 32 out of phase. Therefore, even though the third eccentric weight 56 minimally increases the eccentric moment of the eccentric assembly 16, the overall eccentric moment decreases as the member 42 moves away from the first position.

Figure 8:
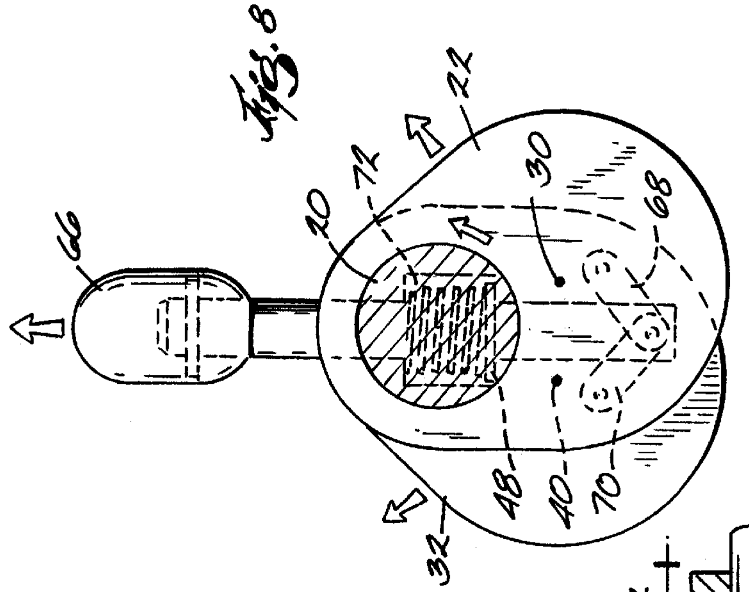
FIG. 8 is a section view similar to FIG. 7, illustrating the eccentric assembly in a dynamic high frequency condition with the eccentric weights out-of-phase.
Figure 6:
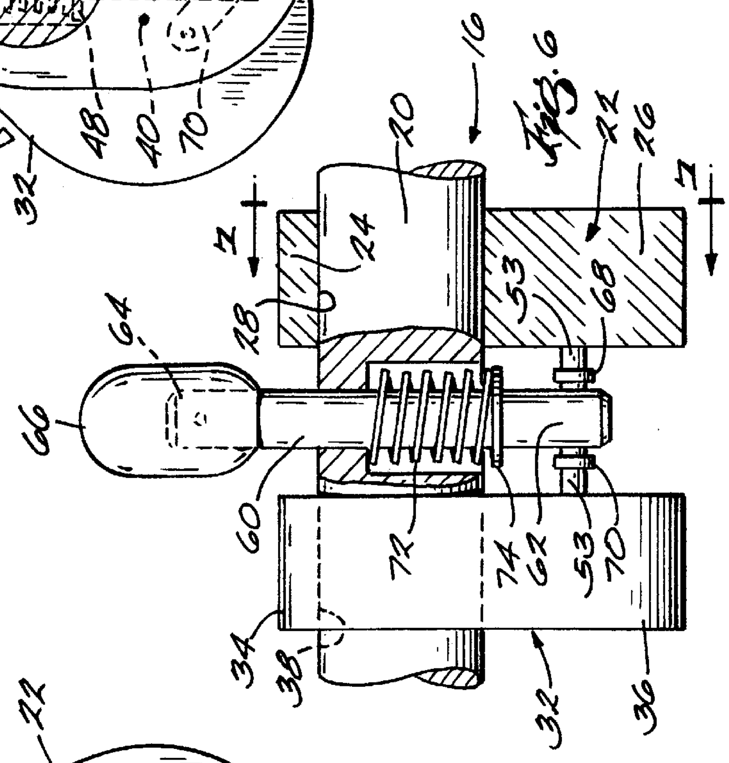
FIG. 6 is an enlarged partial front view of another embodiment of the eccentric assembly.
Figure 7:
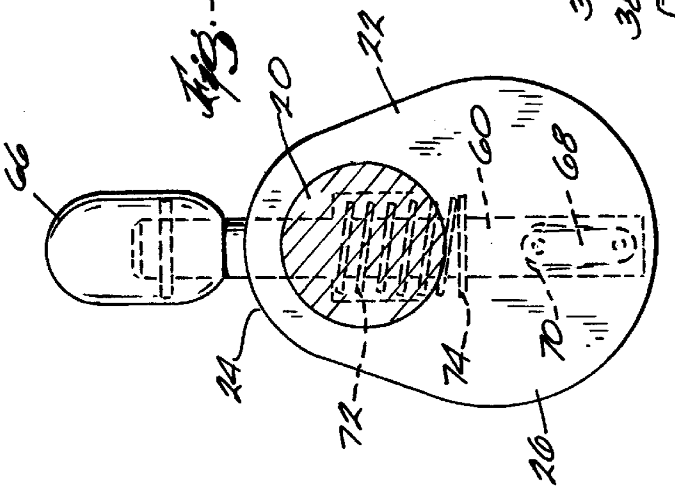
FIG. 7 is a section view taken along line 7—7 in FIG. 6, illustrating the eccentric assembly in a static condition with the eccentric weights in phase.

FIGS. 6–8 illustrate an alternative embodiment of the eccentric assembly 16 of the present invention. In this embodiment, the eccentric assembly 16 includes a member 60 that is slidably connected to the shaft 20 between the first eccentric weight 22 and the second eccentric weight 32. The member 60 has a first end 62 and a second end 64. The first end 62 is coupled to the first and second eccentric weights 22, 32, and the second end 64 is coupled to a counterweight 66. The counterweight 66 is preferably cylindrically shaped and is connected to the second end 64 of the member 60 by a pin.

The eccentric assembly 16 includes a first linkage 68 that connects the first end 62 of the member 60 to the wide portion 26 of the first eccentric weight 22 and a second linkage 70 that connects the first end 62 of the member 60 to the wide portion 36 of the second eccentric weight 32. When the member 60 is in the first position, the linkages 68, 70 maintain the first and second eccentric weights 22, 32 in phase. As the member 60 moves toward the second position, the linkages 68, 70 move the first and second eccentric weights 22, 32 out of phase.

Referring to FIGS. 7 and 8, when the first end 62 of the member 60 moves toward the shaft 20 from the first position to the second position, the opposing ends of the first and second linkages 68, 70 separate from each other thereby creating an angle between the first and second linkages 68, 70.

A spring 72 is located between the shaft 20 and a spring retainer 74 that is located near the first end 62 of the member 60. The spring 72 is preferably a coil spring that biases the member 60 towards the first position.

During operation of the eccentric assembly 16, the member 60 is in the first position and the first and second eccentric weights 22, 32 are in phase before the motor 15 begins to turn the shaft 20. The biasing force of the spring 72 forces the counterweight 66 as close to the shaft 20 as possible. As the motor 15 begins rotating the shaft 20, the eccentric weights 22, 32 begin generating vibrations that are transferred to the drum assembly 14, and a centrifugal force urges the counterweight 66 to move away from the axis of rotation 18 of the shaft 20.

When the shaft 20 rotates at a high enough speed, the centrifugal force acting on the counterweight 66 overcomes the biasing force provided by the spring 72 such that the counterweight 66 further compresses the spring 72 and slides the member 60 from the first position toward the second position. As the member 60 moves from the first position, the first end 62 of the member 60 moves the linkages 68, 70 such that the first linkage 68 moves the first eccentric weight 22 in a first direction about the shaft 20 and the second linkage 70 moves the second eccentric weight 32 in an opposite direction about the shaft 20. As stated previously, the moment of eccentricity about the shaft 20 decreases from the maximum as the eccentric weights 22, 32 move out of phase.

It should be noted that because the counterweight 66 is moving radially away from the axis of rotation 18, the counterweight 66 actually further decreases the moment of eccentricity. However, the decrease due to the counterweight's 66 motion is negligible when compared to the substantial decrease in the eccentric assembly's moment of eccentricity caused by moving the first and second eccentric weights 22, 32 out of phase.

What is claimed is:

1. An eccentric assembly for a vibration compacting vehicle, the eccentric assembly comprising:

a shaft rotatably mounted to a drum assembly on the vibration compacting vehicle, the shaft being rotatable about an axis;

a first eccentric weight rotatably mounted to the shaft;

a second eccentric weight rotatably mounted to the shaft; and a member coupled to the first eccentric weight and the second eccentric weight, the member being slidably mounted to the shaft and moveable between a first position where the first eccentric weight and the second eccentric weight are in phase and a second position where the first eccentric weight and the second eccentric weight are out of phase, the member being biased toward the first position and configured to displace toward the second position when the shaft rotates at a sufficient rotational speed.

2. The eccentric assembly of claim 1, wherein movement of the member between the first and second positions rotates the first eccentric weight and the second eccentric weight in opposite directions.

3. The eccentric assembly of claim 2, wherein increasing the rotational speed of the shaft moves the member from the first position toward the second position such that the first and second eccentric weights are more out of phase.

4. The eccentric assembly of claim 2, wherein decreasing the rotational speed of the shaft moves the member from the second position toward the first position such that the first and second eccentric weights are more in phase.

5. The eccentric assembly of claim 1, wherein the maximum moment of eccentricity occurs when the member is in the first position and the first and second eccentric weights are in phase.

6. The eccentric assembly of claim 1, wherein the minimum moment of eccentricity occurs when the member is in the second position.

7. The eccentric assembly of claim 1, wherein the member is biased toward the first position.

8. The eccentric assembly of claim 7, wherein the member is biased toward the first position by a coil spring.

9. The eccentric assembly of claim 7, wherein rotating the shaft generates a centrifugal force acting on the member which overcomes the biasing force and moves the member from the first position toward the second position such that the first eccentric weight rotates in one direction and the second eccentric weight rotates in an opposite direction relative to the first eccentric weight.

10. The eccentric assembly of claim 9, wherein the first and second eccentric weights are rotated such that the first and second eccentric weight are more out of phase as the speed of the shaft increases.

11. The eccentric assembly of claim 7, wherein decreasing the rotational speed of the shaft allows the biasing force to overcome the centrifugal force acting on the member and moves the member from the second position toward the first position such that the first eccentric weight rotates in one direction and the second eccentric weight rotates in an opposite direction relative to the first eccentric weight.

12. The eccentric assembly of claim 11, wherein the first and second eccentric weights are rotated such that the first and second eccentric weights are more in phase as the speed of the shaft decreases.

13. The eccentric assembly of claim 1, wherein the member is connected to the first eccentric weight by a first linkage and is connected to the second eccentric weight by a second linkage.

14. The eccentric assembly of claim 13, wherein the first and second linkage are connected to an end of the member.

15. The eccentric assembly of claim 14, wherein the first and second linkages are connected to the member and the first and second eccentric weights by shoulder bolts that allow for rotation of the linkages about the shoulder bolts.

16. An eccentric assembly for a vibration compacting machine, the eccentric assembly comprising:

a shaft rotatably mounted to a drum assembly on the vibration compacting machine, the shaft being rotatable about an axis;

a first eccentric weight rotatably mounted to the shaft;

a second eccentric weight rotatably mounted to the shaft;

a member slidably mounted to the shaft, the member including a first end on one side of the shaft and a second end on the other side of the shaft, the first end being coupled to the first eccentric weight and the second eccentric weight;

a counterweight connected to the second end of the member;

a spring located around the member and positioned between the shaft and the first end of the member for biasing the counterweight towards the shaft; and wherein the member is moveable between a first position where the first eccentric weight and the second eccentric weight are in phase and a second position where the first eccentric weight and the second eccentric weight are out of phase.

17. An eccentric assembly for a vibration compacting machine, the eccentric assembly comprising:

a shaft rotatably mounted to a drum assembly on the vibration compacting machine, the shaft being rotatable about an axis;

a first eccentric weight rotatably mounted to the shaft;

a second eccentric weight rotatably mounted to the shaft; and a member slidably mounted to the shaft, the member including a first end on one side of the shaft and a second end on an opposing side of the shaft, the first end being coupled to the first eccentric weight and the second eccentric weight;

a third eccentric weight connected to the first end of the member;

a spring located around the member and positioned between the shaft and the second end of the member for biasing the third eccentric weight towards the shaft; and wherein the member is moveable between a first position where the first eccentric weight and the second eccentric weight are in phase and a second position where the first eccentric weight and the second eccentric weight are out of phase.

18. An eccentric assembly for a vibration compacting machine, the eccentric assembly comprising:

a shaft rotatably mounted to a compacting drum assembly on the vibration compacting machine, the shaft being rotatable about an axis;

a first eccentric weight rotatably mounted to the shaft;

a second eccentric weight rotatably mounted to the shaft; and a cylindrically-shaped rod coupled to the first eccentric weight and the second eccentric weight, the rod extending through and being slidably mounted to the shaft so as to move relative to the shaft in a radial direction and moveable between a first position where the first eccentric weight and the second eccentric weight are in phase and a second position where the first eccentric weight and the second eccentric weight are out of phase.

19. An eccentric assembly for a vibration compacting machine, the eccentric assembly comprising:

a shaft rotatably mounted to a drum assembly on the vibration compacting machine, the shaft being rotatable about an axis;

a first, generally wedge-shaped eccentric weight rotatably mounted to the shaft and having a narrow portion and a wide portion;

a second, generally wedge-shaped eccentric weight rotatably mounted to the shaft, the second weight having a narrow portion and a wide portion and being shaped substantially the same as the first weight; and a member coupled to the wide portion of the first eccentric weight by a first linkage and coupled to the wide portion of the second eccentric weight by a second linkage, the member extending through the shaft and being slidably mounted to the shaft so as to be moveable between a first position where the first eccentric weight and the second eccentric weight are in phase and a second position where the first eccentric weight and the second eccentric weight are out of phase.

20. An eccentric assembly for a vibration compacting vehicle, the eccentric assembly comprising:

a shaft rotatably mounted to a drum assembly on the vibration compacting machine, the shaft being rotatable about an axis;

a first eccentric weight rotatably mounted to the shaft;

a second eccentric weight rotatably mounted to the shaft; and a member coupled to the first eccentric weight and the second eccentric weight, the member having a first end and a second end, the first end being connected to the first and second weights being slidably mounted to the shaft and moveable between a first position where the first eccentric weight and the second eccentric weight are in phase and a second position where the first eccentric weight and the second eccentric weight are out of phase; and a counterweight connected to the second end of the member;

a spring located around the member and positioned between the shaft and the first end of the member, the spring biasing the member toward the first position and biasing the counterweight towards the shaft.

21. An eccentric assembly for a vibration compacting vehicle, the eccentric assembly comprising:

a shaft rotatably mounted to a drum assembly on the vibration compacting machine, the shaft being rotatable about an axis;

a first eccentric weight rotatably mounted to the shaft;

a second eccentric weight rotatably mounted to the shaft;

a member coupled to the first eccentric weight and the second eccentric weight and having a first end and a second end, the first and second ends being disposed on opposing sides of the shaft, the member being slidably mounted to the shaft and moveable between a first position where the first eccentric weight and the second eccentric weight are in phase and a second position where the first eccentric weight and the second eccentric weight are out of phase;

a third eccentric weight connected to the first end of the member; and a spring located around the member and positioned between the shaft and a second end of the member, the spring biasing the member is biased toward the first position and biasing the third eccentric weight towards the shaft.

22. An eccentric assembly for a vibration compacting machine, the compacting machine having a drum assembly, the eccentric assembly comprising:

a shaft rotatably mounted within the drum assembly, the shaft being rotatable about a longitudinal axis extending through the shaft;

a first eccentric weight rotatably mounted to the shaft;

a second eccentric weight rotatably mounted to the shaft; and a member coupled to the first eccentric weight and to the second eccentric weight, the member extending through the shaft in a direction generally perpendicular to the axis so as to be moveable in a direction perpendicular to the shaft between a first position where the first eccentric weight and the second eccentric weight are in phase and a second position where the first eccentric weight and the second eccentric weight are out of phase.

* * * * *